Dec. 22, 1953    R. L. FELKER    2,663,094
DEVICE FOR DEMONSTRATING THE ACTION OF SNOW AND
ICE TIRES AND THE METHOD OF MAKING THE SAME
Filed Jan. 16, 1952
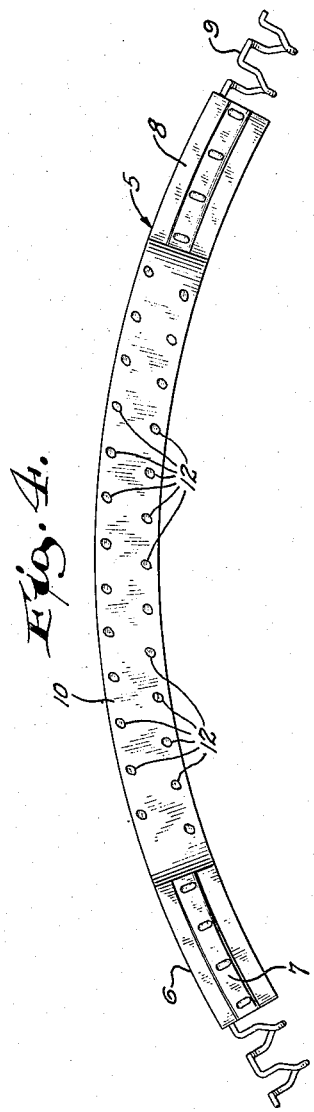
INVENTOR.
Raymond L. Felker
BY
Morsell & Morsell
ATTORNEYS.

Patented Dec. 22, 1953

2,663,094

UNITED STATES PATENT OFFICE 2,663,094

DEVICE FOR DEMONSTRATING THE ACTION OF SNOW AND ICE TIRES AND THE METHOD OF MAKING THE SAME

Raymond L. Felker, Marshfield, Wis., assignor of fifty per cent to Lloyd L. Felker, Marshfield, Wis., and fifty per cent to David E. Crooker, Ontonogan, Mich.

Application January 16, 1952, Serial No. 266,667

7 Claims. (Cl. 35—49)

This invention relates to improvements in devices for demonstrating the action of snow and ice tires and the method of making the same.

Snow and ice tires of the type having traction augmenting wire coils embedded longitudinally therein have proven very successful for winter driving. In use, side portions of the coils which are adjacent the wearing surface of the tire are worn away to form a plurality of staple-like traction augmenting members from said coils. The tips of these staples are normally substantially flush with the wearing surface of the tire.

Whenever an automobile equipped with this type of tire quickly accelerates or suddenly decelerates, as when the brakes are put on, the portions of the tire rider strips in engagement with the roadbed become longitudinally stretched. This causes the tips of the staples to protrude from the wearing surface of the tire to thereby provide greatly increased traction. This action is difficult for some people to visualize, and it is apparent that such action cannot be observed under actual operating conditions. From a sales standpoint, however, it is important that this action be demonstrable.

With the above in mind, it is a general object of the present invention to provide a device for simply and easily demonstrating the action of snow and ice tires of the type having metal coils embedded in the rider strips thereof.

A further object of the invention is to provide a device of the class described which is of a relatively small size and can be readily carried about, and which is so constructed that tire operation under various conditions can be simulated and demonstrated by manual manipulation thereof.

A further object of the invention is to provide an improved method of making a device of the class described including the steps of curing a length of rubber of relatively small cross section around a traction augmenting coil, and then grinding away a side portion of the rubber and coil to form a plurality of staple-like members having their tips exposed at the surface.

A further object of the invention is to provide an improved demonstrating device of the class described which is simple in construction, easy to manufacture, and which is otherwise well adapted for the purposes described.

In the drawing accompanying and forming a part of this specification, wherein one complete embodiment of the preferred form of the invention is shown, and wherein like characters of reference indicate the same parts in all of the views:

Fig. 1 is a plan view of the improved demonstrating device in its normal state;

Fig. 2 is a side elevational view of the improved demonstrating device in its normal state, the embedded portions of the wire coil being shown in dotted lines;

Fig. 3 is a side elevational view of the improved demonstrating device showing it in longitudinally stretched condition to simulate tire action during rapid acceleration or deceleration of an automobile, and showing the staple-like members protruding from the cutaway surface portion of the device; and Fig. 4 is a plan view of the improved demonstrating device showing the latter in longitudinally stretched as well as in laterally bowed condition to simulate the action which takes place in an automobile tire when rounding a curve.

Referring more particularly to the drawing, the numeral 5 indicates the improved demonstrating device which comprises a normally straight elongated piece of rubber 6 which is relatively small and preferably substantially square in transverse cross section. The nature of the cured rubber is such that when furnished in the relatively small cross section shown, it may be grasped at opposite ends and manually stretched a short distance. The device is usually about one-half inch square and of any convenient length for manipulation. The extent 6 may, if desired, be formed in its upper or top surface 8 with a longitudinal central rib 7. A normally straight traction augmenting member 9, which may take the form of a metal coil formed with corrugated wire, is embedded longitudinally in the extent 6. The metal coil 9 preferably has an outer diameter which is less than either transverse dimension of the extent 6, said wire being positioned within said extent so that a side portion thereof extends into the rib 7, and the coil being covered by rubber on both sides and at the bottom. In the absence of a rib 7, the upper side portion of the coil 9 is preferably flush with the upper surface 8 of the extent 6.

A portion of the rib 7, upper surface 8 and coil 9 is ground off or cut away as at 10. The removal of the mentioned side portion of the coil 9 forms from the coil a plurality of staple-like members 11 (see Fig. 2), the tips 12 of which are normally flush with the cutaway surface 10, as shown. This simulates the condition of the wearing surface of a tire after a substantial period of use.

In making the improved demonstrating device the elongated metal coil 9 is placed in a suitable mold cavity in contact with one wall of the mold and is spaced from the other walls thereof. The mold cavity is then filled with uncured rubber 6 which flows between all of the coil convolutions. By the use of heat which has been applied to the mold, the rubber 6 is cured. The cured extent 6 with the coil 9 embedded therein, is then removed from the mold, and the part of the side portion of the extent 6 with which the coil 9 is substantially flush is ground or cut away as at 10, by a suitable abrading device. This simultaneously cuts away a side portion of the coil 9, as shown in Fig. 2, to form the staple-like members 11 previously described.

When the device 5 is in the normal unstressed condition shown in Figs. 1 and 2, the tips 12 of the staple-like members 11 are substantially flush with the surface of the cut-away portion 10, as shown. By manually grasping opposite ends of the extent 6, and by pulling in opposite directions, the tips 12 of the staple-like members 11 are caused to protrude from the surface 10, as is shown in Fig. 3. This is the same action which takes place when an automobile equipped with tires having coils therein rapidly accelerates or is suddenly subjected to a braking action. Thus, the improved device gives a vivid demonstration of what takes place in actual use and quickly sells the observer on the value of the coils as a skid-resisting medium.

By bowing the extent 6 with resulting stretching, as shown in Fig. 4, the device is made to simulate the action of a wire coil equipped tire when the car is rounding a curve. When the device is thus stressed, the tips 12 of the staple-like members 11 again protrude to thereby vividly demonstrate the traction augmenting action of the staples 11 when an automobile equipped therewith rounds a curve.

The improved device permits easy demonstration of the tire action by simple manual manipulation and it effectively demonstrates the position of the tips of the staple-like members under various conditions of operation. The above fact, together with the compactness of the device renders it particularly well adapted for use by salesmen, and the simplicity of its construction renders it inexpensive to manufacture.

Portions of the top surface of the unit 5 may be left unground, as shown at each end in the drawing. This enables the salesman to show customers the condition of the tire tread before wear takes place. In addition, ends of the coil 9 may project from the ends of the rubber to demonstrate the structure of the coil itself.

Various changes and modifications may be made without departing from the spirit of the invention, and all of such changes are contemplated as may come within the scope of the claims.

What I claim is:

1. A device for demonstrating the action of snow and ice tires comprising: a length of rubber which is sufficiently flexible and of such limited cross-sectional size that it can be manually stretched and bowed, and a single elongated traction augmenting member embedded longitudinally within said length of rubber and occupying the major portion of the cross section thereof, a portion of said length of rubber being of reduced thickness, and there being incomplete portions of said traction augmenting member at a surface of said portion which is of reduced thickness.

2. A device for demonstrating the action of snow and ice tires comprising: a length of rubber which is sufficiently flexible and of such limited cross-sectional size that it can be manually stretched and bowed, and a single metal coil embedded longitudinally in said length of rubber and occupying the major portion of the cross section thereof, a portion of said length of rubber being of reduced thickness, portions of said coil being of incomplete staple-like form and having ends exposed at the top surface of said rubber portion which is of reduced thickness.

3. A device for demonstrating the action of snow and ice tires comprising: a normally straight length of rubber which is sufficiently flexible and of such limited cross-sectional size that it can be manually stretched and bowed, and a single normally straight elongated traction augmenting member embedded longitudinally within said length of rubber and occupying the major portion of the cross section thereof, a portion of said length of rubber being of reduced thickness, and there being incomplete portions of said traction augmenting member at a surface of said portion which is of reduced thickness.

4. A device for demonstrating the action of snow and ice tires comprising: a normally straight length of rubber which is sufficiently flexible and of such limited cross-sectional size that it can be manually stretched and bowed, and a single normally straight metal coil embedded longitudinally in said length of rubber and occupying the major portion of the cross section thereof, a portion of said length of rubber being of reduced thickness, portions of said coil being of incomplete staple-like form and having ends exposed at the top surface of said rubber portion which is of reduced thickness.

5. A device for demonstrating the action of snow and ice tires comprising: a length of rubber which is sufficiently flexible and of such limited cross-sectional area that it can be manually stretched and bowed, and a single elongated metal coil embedded longitudinally within said length of rubber and occupying the major portion of the cross section thereof, a portion of said length of rubber being of reduced thickness, and portions of said coil being of incomplete staple-like form and having ends exposed at the top surface of said rubber portion which is of reduced thickness.

6. A device for demonstrating the action of snow and ice tires comprising: a length of rubber which is sufficiently flexible and of such limited cross-sectional area that it can be manually stretched and bowed, and a single elongated metal coil embedded longitudinally within said length of rubber and occupying the major portion of the cross section thereof, a portion of said length of rubber being of reduced thickness, and portions of said coil being of incomplete staple-like form and having ends exposed at the top surface of said rubber portion of reduced thickness, another portion of the length of rubber being of full thickness, and sides of complete coil portions being substantially flush with the top of said last-mentioned portion.

7. A device for demonstrating the action of snow and ice tires comprising: a length of rubber which is sufficiently flexible and of such limited cross-sectional area that it can be manually stretched and bowed, and a single elongated metal coil embedded longitudinally within said length of rubber and occupying the major portion of the cross section thereof, a portion of said length of rubber being of reduced thickness, and portions of said coil being of incomplete staple-like form and having ends exposed at the top surface of said rubber portion of reduced thickness, another portion of the length of rubber being of full thickness, and sides of complete coil portions being substantially flush with the top of said last-mentioned portion, an end portion of the coil projecting from an end of the length of rubber.

RAYMOND L. FELKER.

References Cited in the file of this patent

UNITED STATES PATENTS

| Number | Name | Date |
| --- | --- | --- |
| 1,159,244 | Midgley | Nov. 2, 1915 |
| 1,740,616 | Midgley | Dec. 24, 1929 |
| 2,479,474 | Crooker | Aug. 16, 1949 |
| 2,526,746 | Hawkinson | Oct. 24, 1950 |
| 2,568,542 | Friestedt | Sept. 18, 1951 |
| 2,600,506 | Rimes | June 17, 1952 |
| 2,600,534 | Hawkinson | June 17, 1952 |